US005794325A

United States Patent [19]
Fallandy

[11] Patent Number: 5,794,325
[45] Date of Patent: Aug. 18, 1998

[54] ELECTRICALLY OPERATED, SPRING-BIASED CAM-CONFIGURED RELEASE MECHANISM FOR WIRE CUTTING AND SEATING TOOL

[75] Inventor: Michael M. Fallandy, Ventura, Calif.

[73] Assignee: Harris Corporation, Melbourne, Fla.

[21] Appl. No.: 660,469

[22] Filed: Jun. 7, 1996

[51] Int. Cl.$^{6}$ .............................. B23P 19/02; H01R 43/00; B25D 11/00

[52] U.S. Cl. ............................ 29/566.4; 29/750; 173/203

[58] Field of Search .................................... 29/566.3, 750, 29/758, 566.4, 751, 752; 173/203, 205, 133, 48, 117, 104, 109, 123; 227/132

[56] References Cited

U.S. PATENT DOCUMENTS

| | | | |
|---|---|---|---|
| 1,029,824 | 6/1912 | Rodrigues | 173/203 X |
| 1,798,082 | 3/1931 | Grutzbach | 173/203 |
| 3,685,594 | 8/1972 | Koehler | 173/48 |
| 3,924,692 | 12/1975 | Saari | 173/117 |
| 4,431,062 | 2/1984 | Wanner | 174/104 |
| 4,641,714 | 2/1987 | Ferioli | 173/109 |

FOREIGN PATENT DOCUMENTS

| | | | |
|---|---|---|---|
| 1083395 | 1/1955 | France | 173/203 |
| 424603 | 5/1967 | Switzerland | 173/203 |

*Primary Examiner*—William R. Briggs
*Attorney, Agent, or Firm*—Charles E. Wands

[57] ABSTRACT

A pistol-configured, electrically operated impact tool for seating and cutting a wire includes a D.C. motor whose output shaft has transversely extending, cam surface-engaging elements that engage a cam-configured impact element. As the output shaft is rotated by the operation of the D.C. motor, the cam surface-engaging elements are rotated to an angle where they begin to engage cam portions of the impact element. As a result of this engagement, the impact element is linearly translated away from the cutting tool holder and toward the electric motor. During this linear translation of the impact element away from the cutting tool holder, a bias spring is compressed, so as to increase the force stored in the spring. Eventually, the output shaft will be rotated to an angle brings the cam surface-engaging elements into alignment with a prescribed feature of the cam portions of the impact element. At this point, the compression spring is fully compressed and the force stored in the compression spring is released, thereby providing a prescribed wire seating and cutting impact stroke to the impact element. The impact element is rapidly propelled toward the cutting tool holder, so that the hammer strikes the cutting tool holder, whereby the wire seating and cutting tool attached to the tool holder seats and cuts one more wires in the terminal block.

29 Claims, 6 Drawing Sheets

ELECTRICALLY OPERATED, SPRING-BIASED CAM-CONFIGURED RELEASE MECHANISM FOR WIRE CUTTING AND SEATING TOOL

FIELD OF THE INVENTION

The present invention relates in general to impact tools of the type employed in the telephone industry for inserting the free end of each of one or more wires into resilient electrical terminals mounted to connector blocks of telephone office mainframes, and is particularly directed to an electric motor-driven, spring-biased, cam-configured release mechanism for a wire cutting and seating tool.

BACKGROUND OF THE INVENTION

The telephone industry currently offers its craftspersons a variety of manually operated impact tool configurations for cutting and seating individual telephone wires in terminal blocks that are mounted to telephone office mainframe units. For an illustration of documentation describing non-limiting examples of such manually operated impact tools, attention may be directed to U.S. Pat. Nos. 5,195,230, 4,696,090, 4,567,639, and 4,241,496 and the patents cited therein.

Typically, a mechanically operated impact tool has a generally longitudinal handle from which a wire-gripping and cutting head extends. The interior of the handle may contain an axially translatable hammer element, which is biased by a compression spring to strike the cutting head, and thereby cut one end of a wire that has been seized or inserted into a wire capture and gripping end region of the cutting head.

In accordance with the operation of one conventional tool configuration, the craftsperson grasps the impact tool handle and pushes it by hand against a wire in a terminal receptacle. A hammer release element within the handle is thereby moved into alignment with the hammer travel path, causing the force stored in a main compression spring to be mechanically released, causing the hammer to be rapidly propelled toward and impact the cutting head, so that the end of the wire is cut and becomes seated in the terminal.

One of the principal shortcomings of one type of mechanical impact tools currently in use is the need for the craftsperson to push the handle with more force than is required to compress the main spring. This need for additional force is due to the fact that the hammer release element employs a (wedge-configured) push-plate that must be moved transverse to the hammer's translation axis, in order to achieve alignment with an insertion slot, and allow the hammer to be released. Since the push-plate is moved by the application of force along the handle axis, the total amount of axially imparted force required to operate the tool is that required to both compress the main spring and move the push-plate. As a consequence, its use is time-consuming and labor-intensive, thereby increasing the cost of installation of telephone equipment.

In order to reduce the amount of effort required to operate such a tool, and thereby lessen the labor burden on the craftsperson, an electrically operated, wire cutting and seating tool gun, a diagrammatic sectional view of which is illustrated in FIG. 1 and described in co-pending patent application Ser. No. 08/498,242 (hereinafter referred to as the '242 application), filed Jul. 5, 1995, now U.S. Pat. No. 5,666,715, entitled "Electrically Operated Impact Tool Gun," by E. Zoiss et al, assigned to the assignee of the present application and the disclosure of which is herein incorporated, has been proposed. Thus, the tool gun is connectable by way of a standard electrical power cord to an AC voltage source and is operative to seat and cut a wire simply by the operator 'squeezing' a trigger mechanism which operates a solenoid drive circuit for firing the tool.

To facilitate its use, the tool gun is 'pistol'-configured having a pistol grip 21 and a generally cylindrically shaped barrel portion 23. The pistol grip 21 contains a solenoid drive circuit 25, which is coupled through a power cord 12 to a source of external AC power and trigger mechanism 16 for actuating the solenoid drive circuit 25. When the operator squeezes the trigger mechanism 16, the solenoid drive circuit 25 supplies an energizing current pulse of a prescribed magnitude and duration to a solenoid 27 within barrel portion 23 of the tool. This pulse energization of the solenoid causes rapid translation of a solenoid plunger 31 and a plunger extension hammer 33 in the barrel 23, so that the solenoid plunger extension hammer 33 is translated to strike a cutting tool holder 40. When the hammer 33 strikes the cutting tool holder 40, a wire seating and cutting tool 42 attached to the tool holder 40 seats and cuts one or more wires in the terminal block. After termination of the solenoid energizing pulse, restoration energy stored in a pair of compression springs 44 and 46 returns the solenoid plunger 31 and the tool holder 40 to previous at rest positions, so that the tool gun is ready for seating and cutting another wire or wires.

Now although the solenoid-fired wire cutting and seating tool described in the '242 application overcomes the above-discussed disadvantages of mechanical impact tools (especially the need for the craftsperson to physically push the handle with a substantial amount of force), it would be desirable to employ an alternative electrical drive mechanism for driving the impact tool that has a reduced electrical component complexity.

SUMMARY OF THE INVENTION

In accordance with the present invention, such an alternative approach is provided by a similar 'pistol grip'-configured electrically operated impact tool that employs a rotational drive device, such as a D.C. electric motor (in place of a solenoid), that does not require an associated control circuit to supply a prescribed magnitude and duration of energizing current, to 'fire' the tool gun. Instead, a mechanical interface—in particular, a spring-loaded, helix-configured cam—is installed between a rotatably driven output shaft of the electric motor and the tool holder, to define both the impact force and the point at which an impact hammer is fired against the tool holder.

As will be described, the combination of a D.C. electric motor and the cam-configured mechanical interface means that the current drive input to the D.C. motor need not be of a predefined magnitude or duration. The D.C. motor drive unit effectively the same as that employed in a portable, rechargeable battery-powered electric drill, with the operator controlling both speed of and duration of rotation of the motor's output shaft by finger pressure on the trigger.

For this purpose, the pistol-configured, electrically driven wire-cutting and seating tool gun of the invention a generally hollow pistol grip and a generally cylindrically shaped hollow barrel. The tool gun's barrel includes a cylindrical main barrel body portion interfaced with the pistol grip and a nose portion. A seating and cutting tool is captured in a linearly translatable wire seating and cutting tool holder that is retained in the nose portion of the tool gun barrel. The pistol grip houses a trigger-operated switch circuit and a DC power supply (batteries) for controlling the operation of the D.C. motor that is housed within a butt portion of the tool gun barrel.

In accordance with a first embodiment of the invention, the motor's output shaft has a plurality of end projections which extend transversely of the longitudinal axis of the barrel and engage a plurality of cam portions of a linearly translatable, generally cup-shaped impact element. The generally cup-shaped impact element has a hammer at a first end thereof, which is sized and shaped to strike a generally flat end face of a neck portion of the generally longitudinal wire seating and cutting tool holder.

The interior cam portions of the generally cup-shaped impact element are configured and spaced apart from one another to provide a slot therebetween, that allows the motor's output shaft to pass between the cam portions. The cam portions are sized such that slot has a pair of collinear, mutually opposed flared portions which allow the pair of end projections of the output shaft to pass between the cam portions when the shaft's end projections are aligned with the flared portions of the slot.

The impact element also includes one or more external projections or ribs which engage an associated longitudinal groove or grooves in the interior surface of the barrel so as to prevent rotation of the impact element and confine its direction of travel to be parallel with the longitudinal axis of the barrel and thereby toward and away from the tool holder. A compression spring surrounds the motor output shaft and is captured between a lip portion of the impact element and an interior cylindrical ledge portion of the barrel adjacent to the electric motor. This compression spring imparts a bias to the impact element so that the cam portions are urged against the transverse end projections of the output shaft.

As in the tool gun described in the above-referenced '242 application, an end cap is mounted upon the neck portion of the cutting tool holder so that its end face is generally coplanar with the generally flat end face of the wire-seating and cutting tool holder. The wire-seating and cutting tool holder has a generally square cross-sectional body portion that extends through a generally square axial bore of the nose portion of the tool gun. The body portion of the tool holder has an axial bore sized to receive a shaft of the wire seating and cutting tool. A pair of generally rectangular U-shaped steel sleeves surround the generally square cross-sectional body portion of the tool holder and provide a rigid, protective encasement for the body portion within the bore.

The reduced diameter, generally cylindrical neck portion of the tool holder extends from the generally square cross-sectional body portion an enters into a generally square cross-sectional nose cavity coaxial with the longitudinal axis. The generally flat end face of the neck portion of the cutting tool holder is normally slightly axially spaced apart from a flat end face of the hammer portion of the impact element. Surrounding the neck portion of the cutting tool holder is a tool holder return compression spring, that is captured between a lip portion of the end cap and a shock-absorbing (rubber) cushion sleeve member.

Prior to a craftsperson squeezing the trigger mechanism and initiating an electrically driven wire seating and cutting operation, he positions the impact tool gun such that the seating and cutting tool head of the tool installed in the tool holder is urged against a wire to be inserted into a terminal of a terminal block. In some arbitrary 'at rest' state of the tool, the transverse end projections of the electric motor's output shaft will have passed through the slot between the cam portions of the impact element. To begin seating and cutting a wire, the craftsperson squeezes the trigger closing the switch circuit and causing energizing current to be supplied to the D.C. motor.

As the output shaft is rotated by the operation of the D.C. motor the transverse end projections of the shaft are rotated to an angle where they begin to engage the interior surfaces of the cam portions of the impact element. As a result of this engagement between the transverse end projections of the output shaft and the cam portions of impact element, the impact element is linearly translated away from the cutting tool holder and toward the electric motor. During this linear translation of the impact element away from the cutting tool, the bias spring is compressed, so as to increase the force stored in the spring.

Eventually, the output shaft will be rotated to an angle brings the transverse end projections of the shaft into alignment with the slot between the cam portions of the impact element. At this point, the compression spring is fully compressed and the force stored in the compression spring and being imparted to the impact element is released, thereby providing a prescribed wire seating and cutting impact stroke to the impact element. The impact element is thereby rapidly propelled toward the cutting tool holder, so that the hammer strikes the cutting tool holder, whereby the wire seating and cutting tool attached to the tool holder seats and cuts one more wires in the terminal block.

In accordance with a second embodiment, the plurality of transverse end projections on the motor's output shaft of the first embodiment are replaced by a screw-configured element that has a plurality of ramp surfaces sized and shaped to conform with the shapes of respective ones of the plurality of the cam portions of the linearly translatable, cup-shaped impact element. These ramp surfaces are designed to provide a larger contact surface area between the driving element—the motor output shaft, and the driven element—the impact element, and thereby reduce wear, increase component strength, and provide a larger mutual lubrication surface region between the two elements.

In the second embodiment, a multi-ramp screw element has a generally cylindrical body portion that contains a longitudinal bore which is sized to be secured to the motor output shaft. One end of the multi-ramp screw element is comprised of a pair of arcuate-shaped ramp portions having respective ramp surfaces formed in the shape of respective arcuate helices that extend from the distal end and wind around the outer surface of the screw element. In a complementary manner, the linearly translatable, generally cup-shaped impact element has a generally cylindrical body portion with a bore formed in an end cap portion thereof. This bore is sized to allow the multi-ramp screw element to pass therethrough, and opens into a larger diameter internal bore, which is internally terminated by a pair of generally arcuate ramp-shaped land portions. These generally arcuate ramp-shaped land portions include respective ramp surfaces that are formed in the shape of respective arcuate helices.

Each of the ramp surfaces of the generally arcuate ramp-shaped land portions of the impact element has a generally semicircular arcuate shape. The ramp surfaces are sized and shaped to conform with the shapes of the cam portions of the linearly translatable, cup-shaped impact element, so as to provide substantial engagement surface area between the multi-ramp screw element mounted to the motor output shaft and the driven cup-shaped impact element to which a generally cup-shaped hammer is mounted.

The cup-shaped impact element further includes a generally annular portion adjoining the body portion, with a pair of lip portions projecting from the annular portion and sized to be received within respective tracks in the barrel, thereby preventing rotation and allowing only axial translation of the impact element within the barrel. A bore in the annular portion of the impact element retains a pin which engages a cam slot of a rotational element of the trigger mechanism. A compression spring surrounds the motor output shaft and is captured between the annular portion of the impact element and an interior cylindrical ledge portion of barrel portion adjacent to the electric motor. Similar to its function in the first embodiment, the compression spring biases the ramp-shaped land portions of the cup-shaped impact element against the cam portions of the multi-ramp screw element mounted to the motor output shaft.

As the output shaft and thereby the multi-ramp screw element attached thereto is rotated by operation of the electric motor, the cup-shaped impact element will be linearly translated away from the cutting tool holder and toward the electric motor. As the impact element is being linearly translated away from the cutting tool holder, it compresses the compression spring, thereby increasing the force stored in the spring. Eventually, the motor output shaft will be rotated to an angle that brings the terminal edges of the ramp surfaces of the arcuate ramp portions of the multi-ramp screw element just past terminal edges of the ramp surfaces of the generally semicircular, arcuate ramp-shaped land portions of the cup-shaped impact element.

Upon the arcuate ramp portions of the multi-ramp screw element passing the terminal edges of the ramp surfaces of the cup-shaped impact element, the cup-shaped impact element is allowed to be axially translated past the multi-ramp screw element, and the force stored in the compression spring is immediately released, thereby providing a prescribed wire seating and cutting impact stroke to the impact element and its associated hammer. As in the first embodiment, the impact element is thereby rapidly propelled toward the cutting tool holder, so that the hammer strikes the cutting tool holder, whereby the wire seating and cutting tool attached to the tool holder seats and cuts one more wires in the terminal block.

During the above-described hammer-tool striking action, a cushion sleeve member installed against an interior end surface of an axial bore through the barrel nose absorbs the impact of an end cap on a neck portion of the cutting tool holder. The restoration energy stored in the return spring is then released, causing the tool holder and the impact element to gradually return to their at rest positions, so that the tool is ready for seating and cutting another wire or wires.

DETAILED DESCRIPTION

Figure 1:
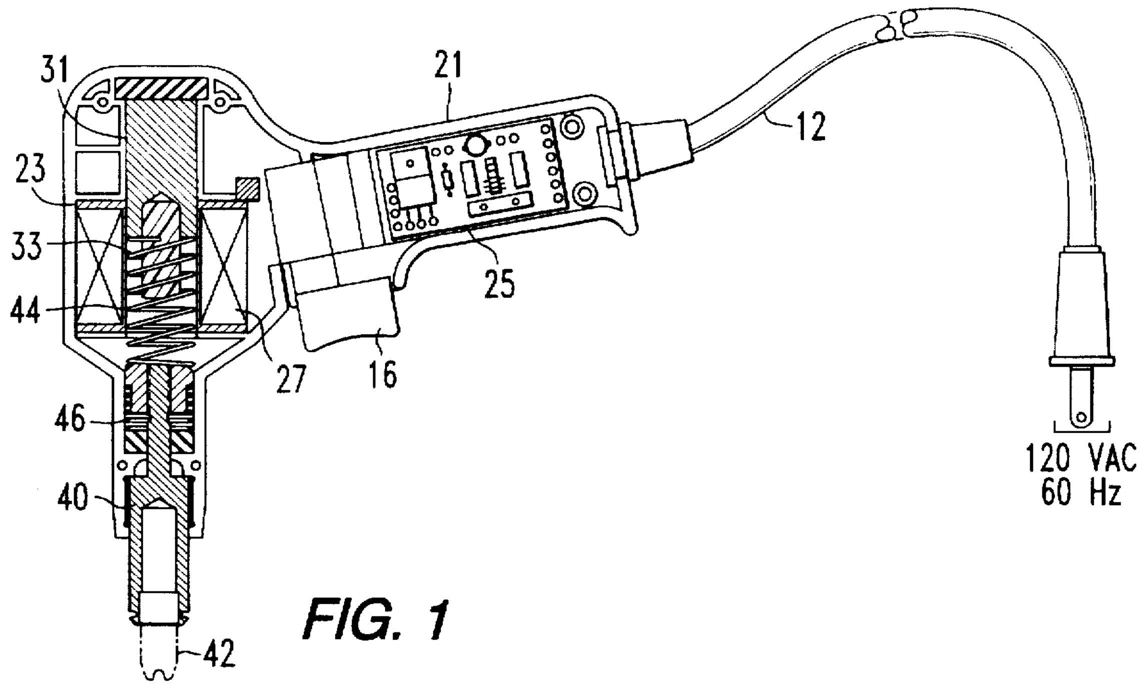
FIG. 1 diagrammatically illustrates an embodiment of a pistol-configured, electrically driven wire cutting and seating tool in accordance with the invention described in the above-referenced '242 application.
Figure 2:
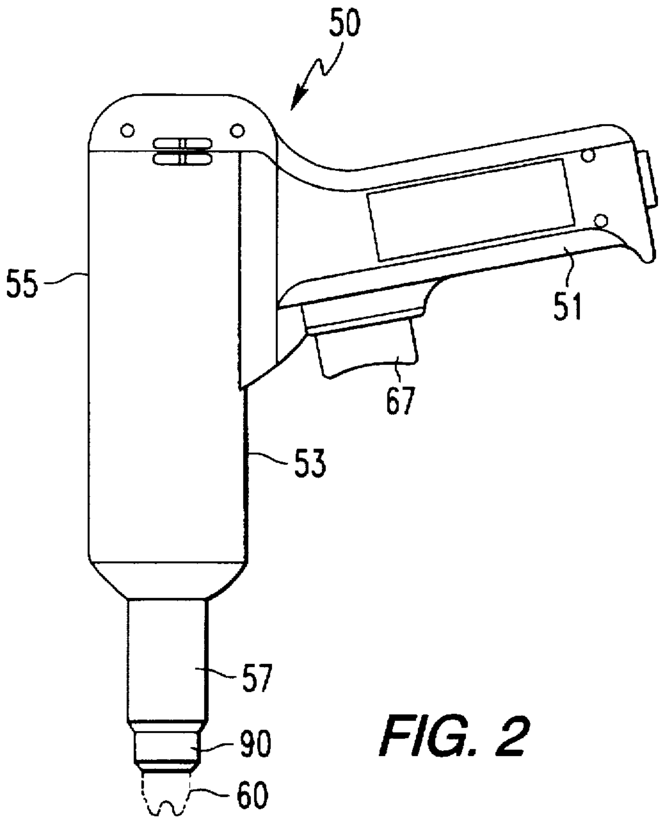
FIG. 2 diagrammatically illustrates an external side view of a first embodiment of a pistol-configured, electrically driven wire-cutting and seating tool gun of the present invention.

FIG. 2 diagrammatically illustrates an external side view of a first embodiment of a pistol-configured, electrically driven wire-cutting and seating tool gun in accordance with the present invention. As shown therein, similar to the electrically operated tool gun of the above-referenced '242 application, shown in FIG. 1, referenced above, the electrically operated tool gun of the present invention includes a 'pistol'-configured housing 50 having a generally hollow pistol grip 51 and a generally cylindrically shaped hollow barrel 53 integral therewith. The generally cylindrically shaped barrel portion 53 includes a cylindrical main barrel body portion 55 which is integrally interfaced with the pistol grip 51 and a nose portion 57 that extends from the main barrel body portion 55. A wire seating and cutting tool is shown generally in broken lines 60 as extending from a generally longitudinal wire seating and cutting tool holder 90.

Figure 3:
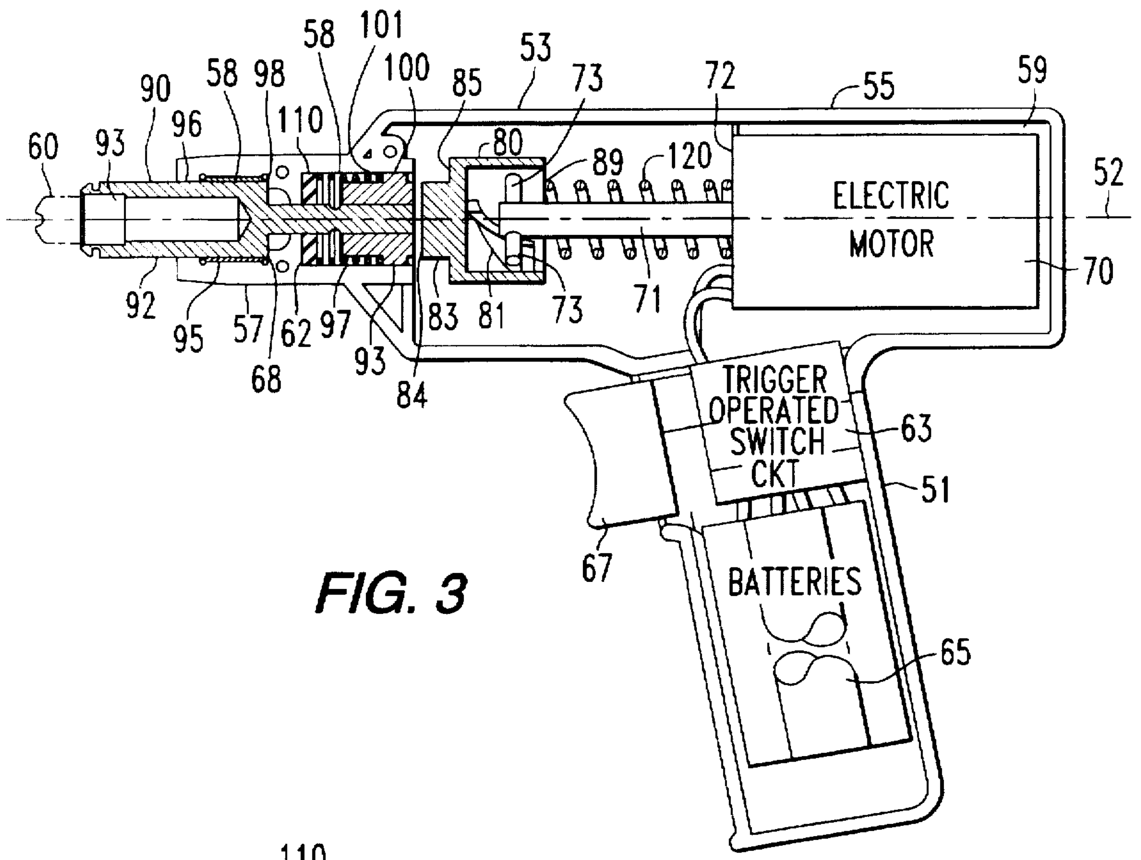
FIG. 3 is an interior sectional view of the pistol-configured, electrically driven wire-cutting and seating tool gun of FIG. 2.

As further shown in the interior sectional view of FIG. 3, pistol grip 51 houses a trigger-operated switch circuit 63 and a DC power supply (batteries) 65, for controlling the operation of a D.C. electric motor 70 (having an associated gearbox) housed within a butt portion 59 of the main barrel body portion 55. The trigger-operated switch circuit 63 is coupled in circuit between the power source 65 and the D.C motor 70 and, when closed by an operator manipulating (squeezing) an external trigger mechanism 67, supplies D.C. current to the electric motor 70. As pointed out above, the D.C. motor drive unit 70 effectively the same as that employed in a portable, rechargeable battery-powered electric drill. This allows the operator to control both speed of and duration of rotation of the motor's output shaft 71 by finger pressure on the trigger, so as to eliminate the need for a precision electrical drive circuit.

The output shaft 71 extends along a longitudinal axis 52 of barrel 53, toward the nose portion 57 of the barrel 53, and has a plurality (e.g., a pair) of end projections 73, which extend transversely of the axis 52 and engage a plurality of cam portions 81 of a linearly translatable, generally cup-shaped impact element 80. Generally cup-shaped impact element 80 has a hammer 83 at a first end 85 thereof, which is sized and shaped to strike a generally flat end face of a neck portion 93 of the generally longitudinal wire seating and cutting tool holder 90. The impact element 80 may be formed as a single piece component including the hammer 83, as diagrammatically illustrated in FIG. 3, or as a multi-piece component as diagrammatically illustrated in FIG. 4.

Figure 5:
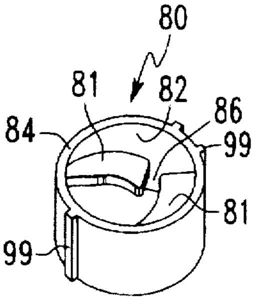
FIGS. 5 and 6 are perspective views of a generally cup-shaped impact element.
Figure 6:
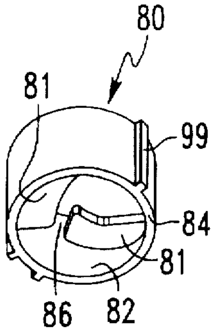
Figure 7:
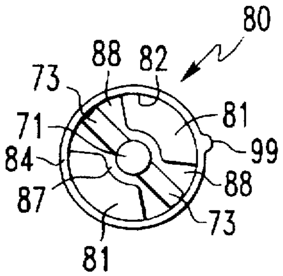
FIG. 7 is an end view of the generally cup-shaped impact element shown in FIGS. 5 and 6.

As shown in perspective in FIGS. 5 and 6 and in the end view of FIG. 7, the interior cam portions 81 of the generally cup-shaped impact element 80 extend from the interior surface 82 of a generally cylindrical sidewall 84 and are configured and spaced apart from one another to provide a slot 86 therebetween. Slot 86 has a generally circular portion 87 of a diameter wider than the diameter of the electric motor's rotatably driven output shaft 71, so as to allow shaft 71 to pass between the cam portions 81. The cam portions 81 are sized such that slot 86 has a pair of collinear, mutually opposed flared portions 88, which are defined so as to allow the pair of end projections 73 of shaft 71 to pass between the cam portions 81, when the shaft's end projections are aligned with the flared portions of the slot (as shown in FIG. 7). Impact element 80 also includes one or more external projections or ribs 99, which engage associated longitudinal slots or grooves in the interior surface of the main body barrel portion 55, so as to prevent rotation of the impact element 80 and confine its direction of travel to be parallel with the longitudinal axis 52 of the main barrel body portion 55, and thereby toward and away from the tool holder 90.

A compression spring 120 surrounds the output shaft 71 and is captured between a lip portion 89 of impact element 80 and an interior cylindrical ledge portion 72 of barrel portion 55 adjacent to the electric motor 70. Compression spring 120 serves to bias the cam portions 81 of the impact element 80 against the transverse end projections 73 of the output shaft 71. As a result, as output shaft 71 is rotated by operation of the electric motor 70, the transverse end projections 73 of the output shaft 71 will engage the interior cam portions 81 of the impact element 80 and thereby cause the impact element 80 to be linearly translated away from the cutting tool holder 90 and toward the electric motor 70 in the butt portion 59 of the tool. As the impact element 80 is linearly translated or withdrawn away from the cutting tool holder 90, it compresses spring 120 so as to increase the force stored in the spring. As will be described below, as the electric motor's output shaft 71 is rotated about axis 52 by the operation of the motor, it will be rotated to an angle brings the transverse end projections 73 of the shaft into alignment with the slot 86 between the cam portions 81 of the impact element 80, and allow the impact element to be propelled toward the tool holder by the force stored in the compression spring.

Figure 4:
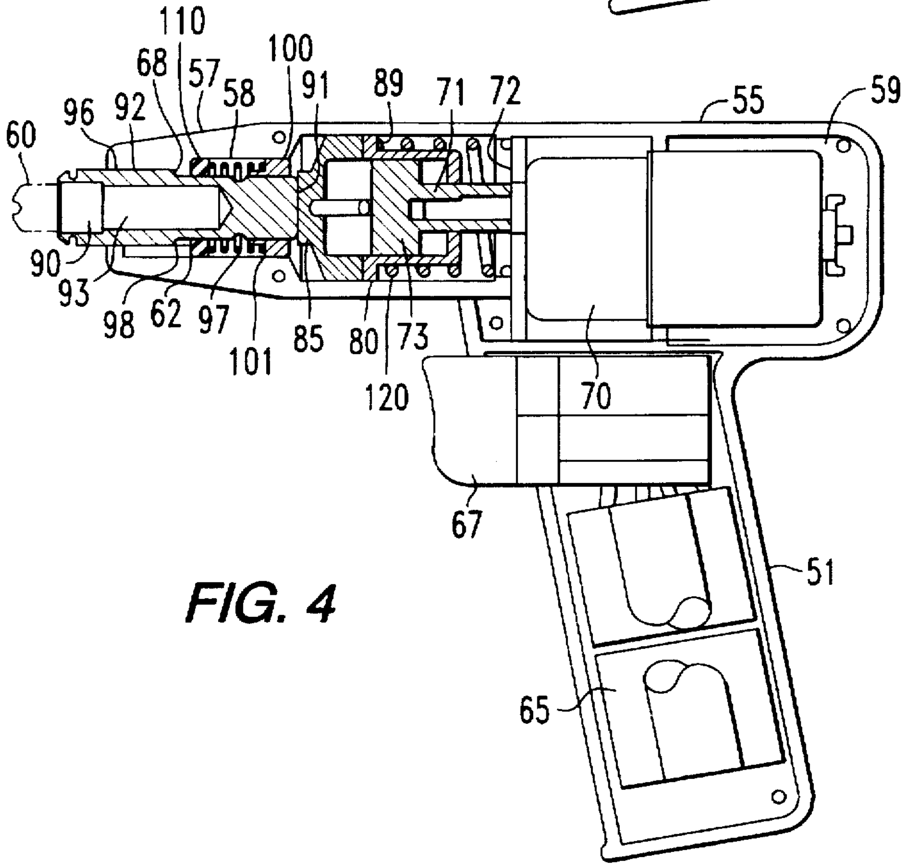
FIG. 4 is an interior sectional view of an embodiment of the impact tool in which the impact element is formed as a multi-piece component.

An end cap 100 is mounted upon the neck portion 93 of the cutting tool holder 90, such that its end face 101 is generally coplanar with (as shown in FIG. 3) or adjacent to (as shown in FIG. 4) the generally flat end face 91 of the wire-seating and cutting tool holder 90. Wire-seating and cutting tool holder 90 has a generally square cross-sectional body portion 92 that extends through a generally square axial bore 96 of the nose portion 57 of the tool gun. The body portion 92 of the tool holder 90 has an axial bore 93, which is sized to receive a shaft of the wire seating and cutting tool 60. A pair of generally rectangular U-shaped steel sleeves 94 and 95 surround the generally square cross-sectional body portion 92 of the tool holder 90 and provide a rigid, protective encasement for the body portion 92 within bore 96.

The reduced diameter, generally cylindrical neck portion 93 of tool holder 90 extends from the generally square cross-sectional body portion 92 thereof an enters into a generally square cross-sectional nose cavity 58 coaxial with the longitudinal axis 52. The generally flat end face 91 of the neck portion 93 of the cutting tool holder 90 is normally slightly axially spaced apart from a flat end face 84 of the hammer portion 83 of the generally cup-shaped impact element 80.

Surrounding the neck portion 93 of the cutting tool holder 90, within a generally annular cavity portion 96 formed between the neck portion 93 of tool holder 90 and the interior surface of cavity 58, is a tool holder return compression spring 97. The tool holder return compression spring 97 is captured between a lip portion 101 of end cap 100 and a shock-absorbing (rubber) cushion sleeve member 110. Cushion sleeve member 110 is installed against an interior end surface 62 of cavity 58. When the cutting tool holder 90 is positioned in its 'at rest' or return position, an end face 98 of the generally square cross-sectional body portion 92 abuts against an end face 68 of bore 58.

OPERATION

Figure 8:
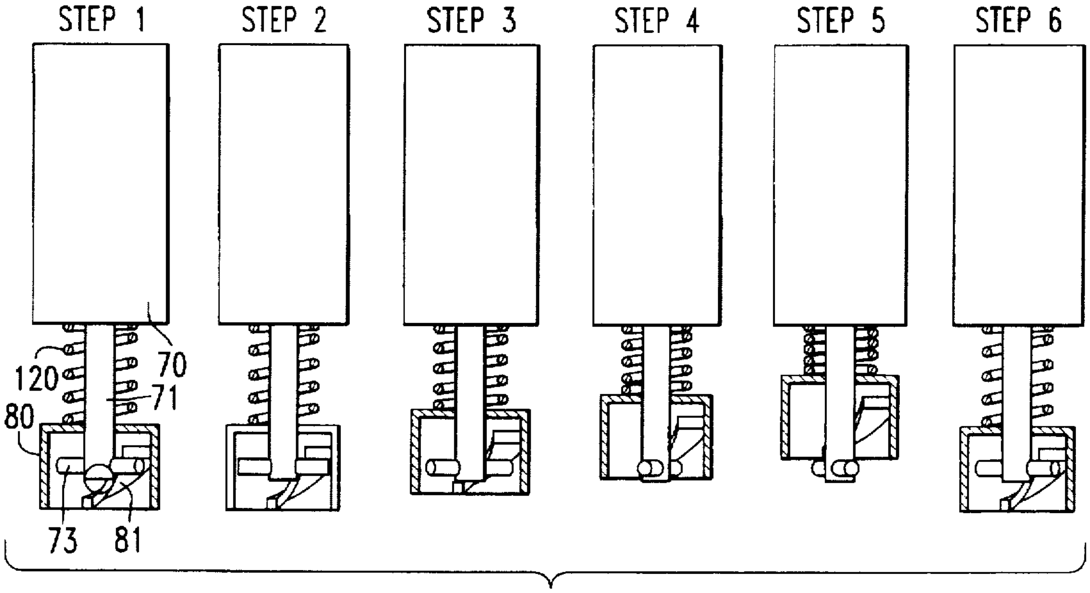
FIGS. 8–14 diagrammatically illustrate the operation of the electromechanical portion of the first embodiment of the electrically driven wire cutting and seating tool of the present invention.
Figure 9:
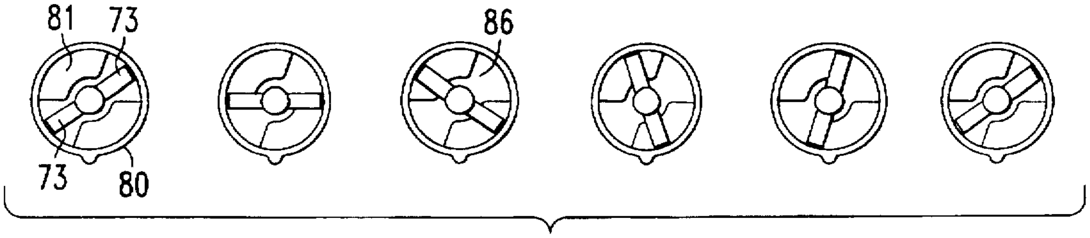
Figure 14:
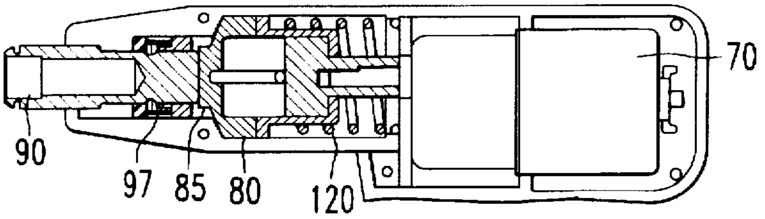

The operation of the electromechanical portion of the electrically driven wire cutting and seating tool of the present invention may be readily understood with reference to FIGS. 8–14. FIGS. 8 and 9 diagrammatically illustrate successive linear translation positions of the impact element 80 and its cam portions 81 for respective rotational positions of the output shaft 71 during rotation thereof by operation of the electric motor 70. FIGS. 10–14 diagrammatically illustrate the relative locations of tool displacement components within the main barrel body portion 55 at successive stages of the operation of the electric motor in response to an operator squeezing the trigger mechanism 67.

It will be understood that, immediately prior to squeezing the trigger mechanism 67 and thereby initiating an electrically driven wire seating and cutting operation, the impact tool gun is positioned such that the seating and cutting tool head of the tool that has been installed in the tool holder 90 is urged against a wire to be inserted into a terminal of a terminal block.

In some 'at rest' state of the tool, the transverse end projections 73 of the electric motor's output shaft 71 will have passed through the slot 86 between the cam portions 81 of the impact element 80. As shown at step 1 in FIGS. 8 and 9 and in FIG. 10, to provide a representative 'starting point', the transverse end projections 73 of the shaft 71 are illustrated as being aligned with the slot 86 between the cam portions 81 of the impact element 80. It should be observed however, that the rotational position of the output shaft 71 may be not necessarily aligned with the slot 86 to begin the operation. The depicted starting point has been chosen to illustrate a complete cycle of rotation of the output shaft 71 and 'firing' of the impact element 80.

Because of compression spring 120, the impact element 80 is biased toward the nose 57 of the barrel 53, in which the tool holder 90 is located. Also, the tool holder return compression spring 97 biases the tool holder 90 toward the impact element, so that the end face 98 of the generally square cross-sectional body portion 92 abuts against the end face 68 of bore 58.

To begin seating and cutting a wire engaged by a cutting and seating tool 60 that has been installed in the tool holder 90, the craftsperson squeezes the trigger 67, closing the switch circuit 63, and thereby causing energizing current to be supplied to the electric motor 70. As the output shaft 71 is rotated by the operation of the motor 70, the transverse end projections 73 of the shaft 71 are rotated to an angle where they begin to engage the interior surfaces of cam portions 81 of the impact element 80, as shown in step 2 of FIGS. 8 and 9. As a result of this engagement between the transverse end projections 73 of the output shaft 71 and the cam portions 81 of impact element 80, the impact element 80 is linearly translated away from the cutting tool holder 90 and toward the electric motor 70, as shown at steps 3–5 of FIGS. 8 and 9 and in FIGS. 11 and 12. During this linear translation of the impact element 80 away from the cutting tool 90, the spring 120 is compressed, so as to increase the force stored in the spring.

Figure 13:
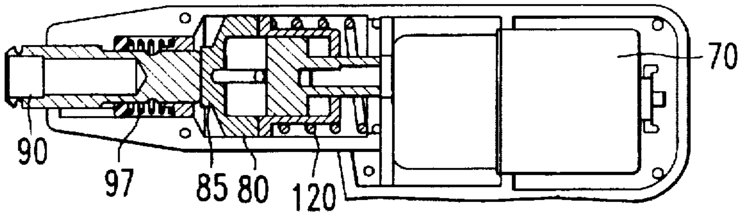
Figure 12:
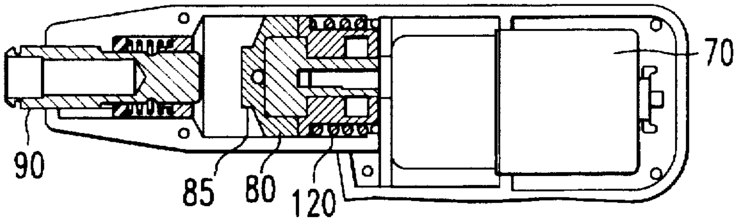
Figure 11:
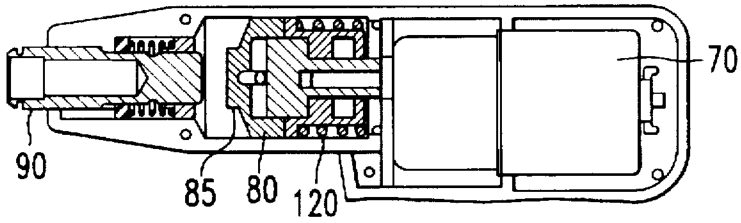
Figure 10:
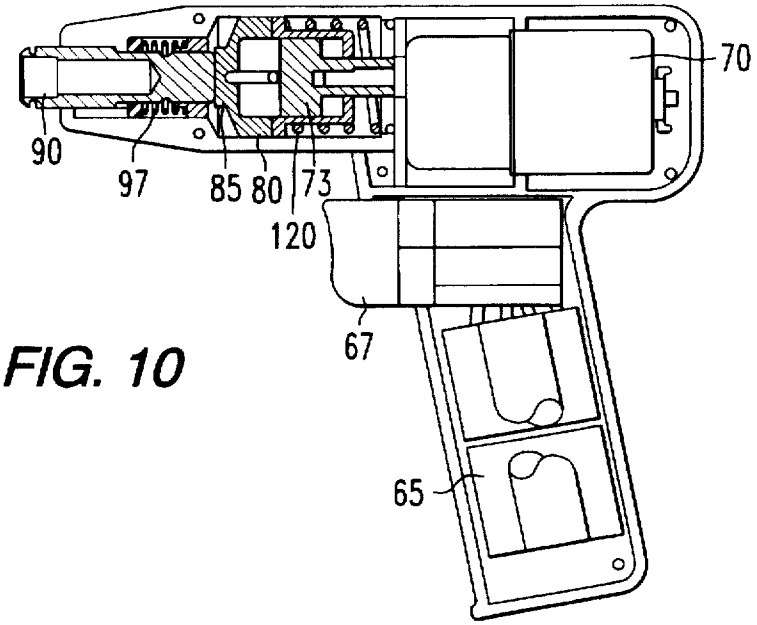

Eventually, as shown at step 6 in FIGS. 8 and 9, and in FIG. 13, the output shaft 71 is rotated to an angle that fully compresses the spring 120, and such that the transverse end projections 73 are brought into alignment with the slot 86 between the cam portions 81 of the impact element 80. At this point, compression spring 120 is fully compressed, and the force stored in the compression spring and being imparted to the impact element is released, providing a prescribed wire seating and cutting impact stroke to the impact element. The impact element is thereby rapidly propelled toward the cutting tool holder, so that the hammer strikes the cutting tool holder, whereby the wire seating and cutting tool attached to the tool holder seats and cuts one more wires in the terminal block.

During this hammer-tool striking action, a cushion sleeve member installed against an interior end surface of an axial bore through the barrel nose absorbs the impact of an end cap on a neck portion of the cutting tool holder. The restoration energy stored in the return spring is released, causing the tool holder and the impact element to gradually return to their at rest positions, so that the tool is ready for seating and cutting another wire or wires.

FIGS. 15–23 diagrammatically illustrate a second embodiment of the present invention, in which the plurality of transverse end projections on the motor's output shaft are replaced by a screw-configured element that has a plurality of helical ramp surfaces sized and shaped to conform with the shapes of respective ones of the plurality of the cam portions of the linearly translatable, cup-shaped impact element. These helical ramp surfaces are designed to provide a larger contact surface area between the driving element—the motor output shaft, and the driven element—the impact element, and thereby reduce wear, increase component strength, and provide a larger mutual lubrication surface region between the two elements.

Figure 15:
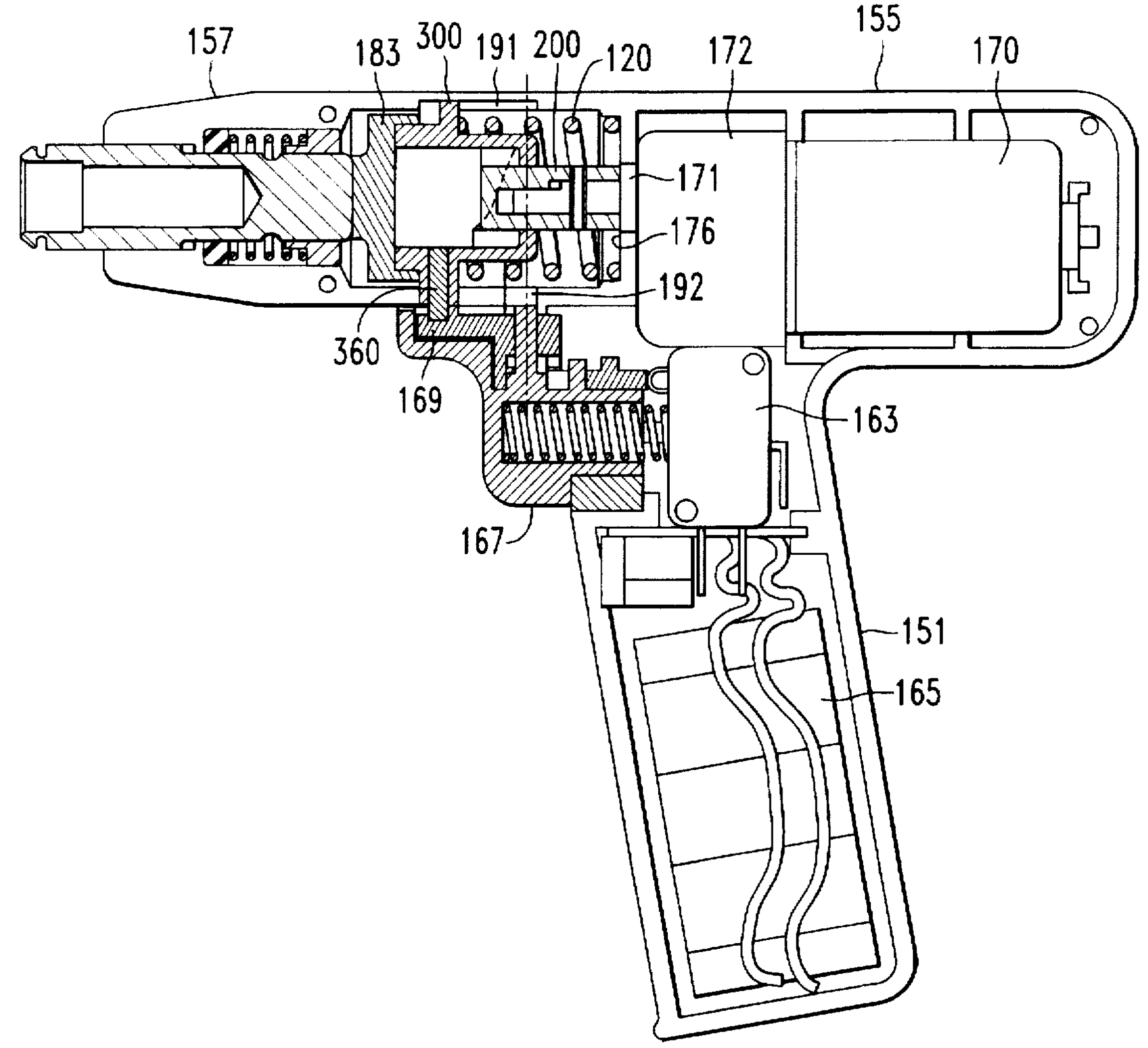
FIG. 15 diagrammatically illustrates an interior side view of a second embodiment of a pistol-configured, electrically driven wire-cutting and seating tool gun of the present invention.

More particularly, similar to the first embodiment shown in FIGS. 3 and 4, in the interior sectional view of the second embodiment of FIG. 15, a pistol grip 151 houses a trigger-operated switch 163 and a DC power supply (battery pack) 165, for controlling the operation of a D.C. electric motor 170 and an associated gearbox 172 housed within the main barrel body portion 155 of the impact gun. The trigger-operated switch 163 is coupled in circuit between the power source 165 and the D.C motor 170 and, when closed by an operator manipulating (squeezing) a trigger mechanism 167 of the type customarily employed in electric hand drills, supplies D.C. current to the electric motor 170. Namely, as in the above embodiment, the D.C. motor drive unit 170 is effectively the same as that employed in a portable, rechargeable battery-powered electric drill, which allows the operator to control both speed of and duration of rotation of the motor's output shaft 171 by finger pressure on the trigger mechanism 167. The output shaft 171 extends from gearbox 172 toward the nose portion 157 of the main barrel body portion 155, and has a multi-ramp screw element 200 mounted thereto for engagement with cam surface portions of a linearly translatable, generally cup-shaped impact element 300.

As shown in FIGS. 16–19, the multi-ramp screw element 200 has a generally cylindrical body portion 203, containing a longitudinal bore 205, which is sized to fit on the motor output shaft 171 and be retained thereon by a set screw (not shown) passing through transverse bore 207. In the illustrated embodiment, a distal end 210 of the generally cylindrical body portion 203 of the multi-ramp screw element 200 includes a pair of generally arcuate-shaped ramp portions 211 and 212 having respective ramp surfaces 221 and 222 thereof formed in the shape of respective arcuate helices 231 and 232 that begin at the distal end 210 and wind around the outer surface of the generally cylindrical body portion. As shown in the end views of FIGS. 18 and 19, arcuate-shaped ramp portions 211 and 212 extend only partially around the circumference of the generally cylindrical body portion 203, so as to provide respective gaps 214 and 215 therebetween.

Complementary to the configuration of the multi-ramp screw element 200 shown in FIGS. 16–19, the linearly translatable, generally cup-shaped impact element 300 is shown in FIGS. 20–23 as having a generally cylindrical body portion 301 having an end cap portion 303 through which a bore 305 is formed. Bore 305 is sized to allow the generally cylindrical body portion 203 of the multi-ramp screw element 200 to pass therethrough. Bore 305 opens into a larger diameter internal bore 307, which is internally terminated by a pair of generally arcuate ramp-shaped land portions 311 and 312. These generally arcuate ramp-shaped land portions 311 and 312 include respective ramp surfaces 321 and 322 that are formed in the shape of respective arcuate helices that begin at the interior end 309 of the bore 307 and surround bore 305.

Figures 16, 17, 18, 19, 20, 21, 22, 23:
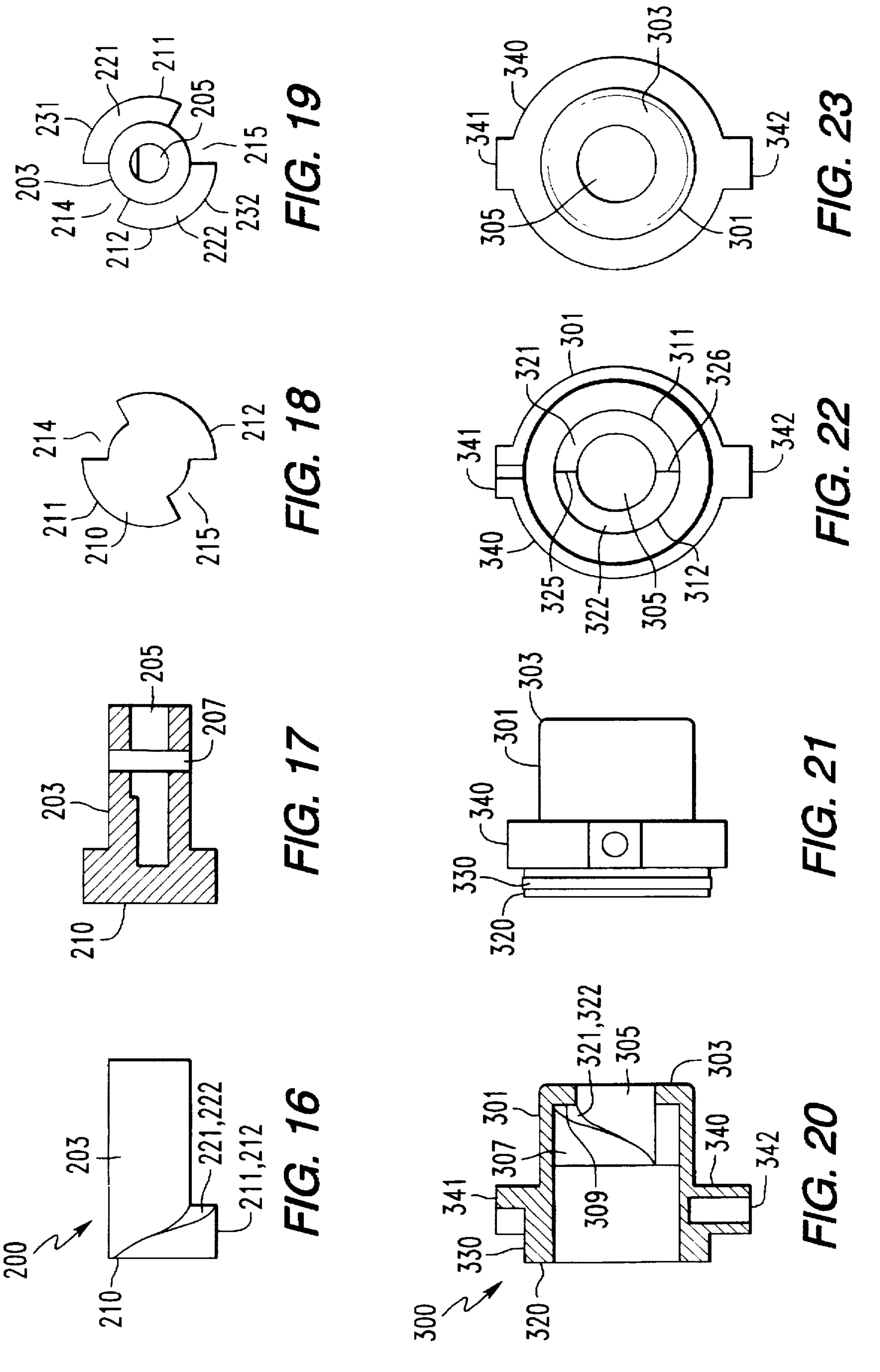
FIG. 16 is a diagrammatic side view of a multi-ramp screw element.
FIG. 17 is a diagrammatic sectional view of the multi-ramp screw element of FIG. 16.
FIGS. 18 and 19 are diagrammatic opposing end views of the multi-ramp screw element of FIG. 16.
FIG. 20 is a diagrammatic sectional view of a linearly translatable, cup-shaped impact element.
FIG. 21 is a diagrammatic side view of the linearly translatable, cup-shaped impact element of FIG. 20.
FIG. 22 and 23 are diagrammatic opposing end views of the cup-shaped impact element of FIG. 20.

As shown in the end view of FIG. 22, each of the ramp surfaces 321 and 322 of the generally arcuate ramp-shaped land portions 311 and 312 of the cup-shaped impact element 300 has a generally semicircular arcuate shape. The ramp surfaces are sized and shaped to conform with the shapes of the cam portions 211 and 212 of the linearly translatable, cup-shaped impact element 200, so as to provide substantial engagement surface area between the multi-ramp screw element 200 mounted to the motor output shaft 171, and the driven cup-shaped impact element 300, to which a generally cup-shaped hammer 183 is mounted, as shown in FIG. 15. In order to affix the generally cup-shaped hammer 183 to the cylindrical end portion 320 of the cup-shaped impact element 300, a raised snap ring region 330 may be molded in a cylindrical end portion 320 of element 300.

Cup-shaped impact element 300 further includes a generally annular portion 340 adjoining generally cylindrical body portion 301. A pair of lip portions 341 and 342 project from annular portion 340 and are sized to be received within respective slots or tracks 191 and 192 in the barrel 155, thereby preventing rotation and allowing only axial translation of the impact element 300 within barrel 155. A bore 350 in annular portion 340 is sized to receive a pin 360 which engages a cam slot 168 of a rotational element 169 of electric hand drill-based trigger mechanism 167.

Compression spring 120 surrounds the motor output shaft 171 and is captured between the annular portion 340 of the impact element 300 and an interior cylindrical ledge portion 176 of barrel portion 155 adjacent to the electric motor 170. As in the foregoing embodiment, the compression spring 120 biases the ramp-shaped land portions 311 and 312 of the cup-shaped impact element 300 against the cam portions 211 and 212 of the multi-ramp screw element 200 mounted to the motor output shaft 171. As a result, as the output shaft 171 (and thereby the multi-ramp screw element 200 attached thereto) is rotated by operation of the electric motor 170, the cup-shaped impact element 300 will be linearly translated away from the cutting tool holder and toward the electric motor.

As the impact element 300 is being linearly translated away from the cutting tool holder, it compresses spring 120, thereby increasing the force stored in the spring. Eventually, the motor output shaft 171 will be rotated to an angle that brings the terminal edges 225, 226 of the ramp surfaces 221, 222 arcuate ramp portions 211 and 212 of the multi-ramp screw element 200 just past terminal edges 325, 326 of the ramp surfaces 321 and 322 of the generally semicircular, arcuate ramp-shaped land portions 311 and 312 of the cup-shaped impact element 300. Upon the arcuate ramp portions 211 and 212 of the multi-ramp screw element 200 passing the terminal edges 325, 326 of the ramp surfaces 321 and 322 of the cup-shaped impact element 300, the cup-shaped impact element 300 is allowed to be axially translated past the multi-ramp screw element 200, and the force stored in the compression spring 120 is immediately released, providing a prescribed wire seating and cutting impact stroke to the impact element and its associated hammer 183. The impact element is thereby rapidly propelled toward the cutting tool holder, so that the hammer 193 strikes the cutting tool holder, whereby the wire seating and cutting tool attached to the tool holder seats and cuts one more wires in the terminal block.

As will be appreciated from the foregoing description, the present invention provides an alternative 'pistol grip'-configured approach to the electrically operated impact tool described in the '242 application, by not requiring a pulse generator circuit for supplying a predefined magnitude and duration of energizing current to a solenoid, in order to 'fire' the tool gun. Instead, by virtue of a spring-loaded, helix-configured cam interface installed between a rotatably driven output shaft of a D.C. electric motor and the tool holder, both the impact force and the point at which an impact hammer is fired against the tool holder are defined. As a result, the present invention is able to used the same type of D.C. motor drive unit as is employed in a portable, rechargeable battery-powered electric drill, with the operator/craftsperson controlling both the speed and duration of rotation of the motor's output shaft by finger pressure on the trigger.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A utility device comprising a rotatable shaft having an axis, a drive unit for rotating said rotatable shaft about said axis, a translatable element, which engage said shaft and is translated in a first direction along said axis by the rotation of said rotatable shaft, and a force-imparting mechanism coupled with said translatable element and being operative to apply a force to said translatable element in a second direction along said axis opposite said first direction, and causing said translatable element to be translated in said second direction along said axis in response to said rotatable shaft having been rotated by said drive unit through a prescribed angle of rotation about said axis; and wherein said translatable element has a cam surface portion and said rotatable shaft has a cam surface engaging portion which extends generally transverse of said axis and engages said cam surface portion of said translatable element, such that rotation of said shaft causes rotation of said cam surface engaging portion thereof against said cam surface portion of said translatable element, and translation of said translatable element in said first direction along said axis;

said cam surface engaging portion of said shaft comprises a transverse projecting element which extends from a main body portion of said shaft generally transverse of said axis, and said cam surface portion of said translatable element has a slot therein, which is sized to allow said transverse projecting element to pass therethrough and become disengaged from said cam surface portion of said translatable element upon said shaft having been rotated through said prescribed angle of rotation about said axis, thereby releasing said translatable element to be translated in said second direction along said axis by the force impart thereto by said force-imparting mechanism; and said translatable element has a cup-shaped configuration containing a plurality of interior cam surfaces with said slot therebetween, said transverse projecting element of said rotatable shaft engaging said plurality of interior cam surfaces as said rotatable shaft is rotated by said drive unit about said axis, until said rotatable shaft has been rotated through said prescribed angle of rotation about said axis, thereby allowing said transverse projecting element to enter said slot and allow said translatable element to be translated in said second direction along said axis by the force impart thereto a said compression spring mounted on said rotatable shaft.

2. A wire cutting device for cutting and seating at least one wire for installation in a telephone wire termination block comprising a rotatable shaft having an axis, a drive device for rotating said rotatable shaft about said axis, a translatable element, which engages said shaft and is translated in a first direction along said axis by the rotation of said shaft, and a force imparting mechanism coupled with said translatable element and being operative to apply a force to said translatable element in a second direction along said axis opposite said first direction, and causing said translatable element to be translated in said second direction alone said axis in response to said translatable element having been translated a prescribed distance in said first direction along said axis, and further including a hammer coupled with said translatable element and arranged to strike a holder for a wire cutting device as a result of said translatable element being translated in said second direction along said axis in response to rotation of said shaft.

3. A wire cutting device according to claim 2, further including a housing having a hand grip and a barrel, said barrel containing said drive unit, shaft, translatable element, force imparting mechanism and said holder, said hand grip containing a trigger unit for operating said drive unit, and thereby causing rotation of said shaft in said barrel.

4. A utility device according to claim 1, wherein said cam surface portion of said translatable element has a termination portion which is configured to allow said cam surface engaging portion of said shaft to become disengaged from said cam surface portion of said translatable element upon said shaft having been rotated through said prescribed angle of rotation about said axis, and thereby allow said translatable element to be translated in said second direction along said axis by the force impart thereto by said force-imparting mechanism.

5. A utility device according to claim 1, wherein said cam surface engaging portion of said shaft comprises a ramp surface element which is coupled to said shaft, and said cam surface portion of said translatable element and said ramp surface element are configured to allow said ramp surface element to become disengaged from said cam surface portion of said translatable element upon said shaft having been rotated through said prescribed angle of rotation about said axis, thereby releasing said translatable element to be translated in said second direction along said axis by the force impart thereto by said force-imparting mechanism.

6. A utility device according to claim 1, wherein said force imparting mechanism comprises a compression spring.

7. A utility device according to claim 1, wherein a compression spring is placed around said rotatable shaft between said translatable element and said drive device in such a manner that, as said drive device rotates said rotatable shaft to translate said translatable element in said first direction along said axis, said compression spring is compressed between said translatable element and said drive device, so as to apply an increasing amount of force to said translatable element as said translatable element is translated in said first direction along said axis by rotation of said rotatable shaft.

8. A utility device according to claim 7, wherein said drive device comprises an electric motor.

9. A utility device comprising a rotatable shaft having an axis, a drive device for rotating said rotatable shaft about said axis, a translatable element, which engages said shaft and is translated in a first direction along said axis by the rotation of said shaft, and a force imparting mechanism coupled with said translatable element and being operative to apply a force to said translatable element in a second direction along said axis opposite said first direction, and causing said translatable element to be translated in said second direction along said axis in response to said translatable element having been translated a prescribed distance in said first direction along said axis; wherein said translatable element has a cam surface portion and said rotatable shaft has a cam surface engaging portion which extends generally transverse of said axis and engages said cam surface portion of said translatable element, such that rotation of said shaft causes rotation of said cam surface engaging portion thereof against said cam surface portion of said translatable element, and translation of said translatable element in said first direction along said axis;

said cam surface engaging portion of said shaft comprises a transverse projecting element which extends from a main body portion of said shaft generally transverse of said axis, and said cam surface portion of said translatable element has a slot therein, which is sized to allow said transverse projecting element to pass therethrough and become disengaged from said cam surface portion of said translatable element upon said translatable element having been translated said prescribed distance in said first direction along said axis by rotation of said shaft, thereby releasing said translatable element from engagement with said cam surface engaging portion of said shaft, and allowing said translatable element to be translated in said second direction along said axis by the force impart thereto by said force imparting mechanism; and said translatable element is cup-shaped and contains plural interior cam surfaces with said slot therebetween, said transverse protecting element of said shaft engaging said interior cam surfaces as said shaft is rotated by said drive unit about said axis, until said shaft has been rotated through a prescribed angle of rotation about said axis, whereby said transverse projecting element enters said slot and translation of said translatable element and is translated in said second direction along said axis by force imparted by said compression spring.

10. An electrically operated impact tool for controllably causing a wire cutting and seating device to cut and seat at least one wire in a telephone wire termination block, comprising a housing containing a rotational drive device having an output shaft which is rotatably driven about an axis, an impact mechanism including a translatable element, which engages said shaft and is translated in a first direction along said axis by the rotation of said shaft, and a force-imparting mechanism coupled with said translatable element and being operative to apply a force to said translatable element in a second direction along said axis opposite said first direction, and causing said translatable element to be translated in said second direction along said axis in response to said shaft having been rotated through a prescribed angle of rotation about said axis, a wire cutting and seating device holder having a first end which is arranged to be struck by said impact mechanism as a result of said translatable element being translated in said second direction along said axis in response to said shaft having been rotated through said prescribed angle of rotation about said axis, and a second end to which said wire cutting and seating device is attached, and wherein said impact mechanism further includes a hammer coupled with said translatable element and arranged to strike said first end of said wire cutting and seating device holder as a result of said translatable element being translated in said second direction along said axis in response to rotation of said shaft through said prescribed angle of rotation.

11. A utility device according to claim 9, wherein said cam surface portion of said translatable element has a termination portion which is configured to allow said cam surface engaging portion of said shaft to become disengaged from said cam surface portion of said translatable element upon said translatable element having been translated said prescribed distance in said first direction along said axis by rotation of said shaft, and thereby allow said translatable element to be translated in said second direction along said axis by the force impart thereto by said force imparting mechanism.

12. An electrically operated impact tool according to claim 10, further including a return spring coupled with said wire cutting and seating device holder and normally urging said wire cutting and seating device holder toward said impact mechanism, said return spring being acted upon by translation of said wire cutting and seating device holder as a result of said hammer striking said wire cutting and seating device holder.

13. An electrically operated impact tool according to claim 12, wherein said wire cutting and seating device holder has a cap portion, and further including a cushion element disposed at a region of said housing supporting said wire cutting and seating device holder, such that said return compression spring is disposed between said cap portion of said wire cutting and seating device holder and said cushion element.

14. A utility device according to claim 9, wherein said cam surface engaging portion of said shaft comprises a ramp surface element which is coupled to said shaft, and said cam surface portion of said translatable element and said ramp surface element are configured to allow said ramp surface element to become disengaged from said cam surface portion of said translatable element upon said shaft having been rotated through said prescribed angle of rotation about said axis, thereby releasing said translatable element to be translated in said second direction along said axis by the force impart thereto by said force-imparting mechanism.

15. A utility device according to claim 9, wherein said force imparting mechanism comprises a compression spring.

16. An electrically operated impact tool according to claim 10, wherein said translatable element has a cam surface portion and wherein said rotatable shaft has a cam surface engaging portion which extends generally transverse of said axis and engages said cam surface portion of said translatable element, such that rotation of said shaft causes rotation of said cam surface engaging portion thereof against said cam surface portion of said translatable element, and translation of said translatable element in said first direction along said axis.

17. An electrically operated impact tool according to claim 16, wherein said cam surface portion of said translatable element has a termination portion which is configured to allow said cam surface engaging portion of said shaft to become disengaged from said cam surface portion of said translatable element upon said shaft having been rotated through said prescribed angle of rotation about said axis, and thereby allow said translatable element to be translated in said second direction along said axis by the force impart thereto by said force imparting mechanism.

18. An electrically operated impact tool according to claim 16, wherein said cam surface engaging portion of said shaft comprises a transverse projecting element which extends from a main body portion of said shaft generally transverse of said axis, and wherein said cam surface portion of said translatable element has a slot therein, which is sized to allow said transverse projecting element to pass therethrough and become disengaged from said cam surface portion of said translatable element upon said shaft having been rotated through said prescribed angle of rotation about said axis, thereby releasing said translatable element to be translated in said second direction along said axis by the force impart thereto by said force imparting mechanism.

19. An electrically operated impact tool according to claim 16, wherein said cam surface engaging portion of said shaft comprises a ramp surface element which is coupled to said shaft, and said cam surface portion of said translatable element and said ramp surface element are configured to allow said ramp surface element to become disengaged from said cam surface portion of said translatable element upon said shaft having been rotated through said prescribed angle of rotation about said axis, thereby releasing said translatable element to be translated in said second direction along said axis by the force impart thereto by said force-imparting mechanism.

20. An electrically operated impact tool according to claim 10, wherein said force-imparting mechanism comprises a compression spring.

21. An electrically operated impact tool according to claim 20, wherein said compression spring surrounds said shaft between said translatable element and said drive device, such that as said drive device rotates said shaft to translate said translatable element in said first direction along said axis, said compression spring is compressed to apply an increasing amount of force to said translatable element as said translatable element is translated in said first direction along said axis by rotation of said shaft.

22. An electrically operated impact tool according to claim 10, wherein said drive device comprises an electric motor.

23. An electrically operated impact tool according to claim 18, wherein said translatable element has a cup-shaped configuration containing a plurality of interior cam surfaces with said slot therebetween, said transverse projecting element of said shaft engaging said plurality of interior cam surfaces as said shaft is rotated by said drive unit about said axis, until said shaft has been rotated through said prescribed angle of rotation about said axis, thereby allowing said transverse projecting element to enter said slot and allow said translatable element to be translated in said second direction along said axis by the force impart thereto by said compression spring.

24. An electrically operated impact tool according to claim 10, wherein said housing has a hand grip and a barrel, said barrel containing said drive unit and said wire cutting and seating device holder, said hand grip containing a trigger unit for operating said electric motor, and thereby causing rotation of said shaft.

25. A pistol-configured, electrically operated impact tool for seating and cutting one or more wires in a terminal block comprising a D.C. motor having an output shaft containing transversely extending cam surface-engaging elements that engage a cam-configured impact element, so that rotation of the output shaft by operation of the D.C. motor causes said transversely extending cam surface-engaging elements of said output shaft to be rotated and engage said cam-configured impact element, and thereby linearly translate said impact element away from a cutting tool holder, compressing a bias spring surrounding said shaft, so as to increase the force stored in said bias spring, until said output shaft is rotated by said operation of said D.C. motor to an angle brings said transversely extending cam surface-engaging elements of said output shaft into alignment with a prescribed feature of said cam-configured impact element, and releases the force stored in said compressed bias spring, thereby providing a prescribed wire seating and cutting impact stroke to said impact element, and rapidly propelling said impact element toward said cutting tool holder, so that a hammer coupled with said impact element strikes said cutting tool holder, causing a wire seating and cutting tool attached to said tool holder to seat and cut one more wires in said terminal block.

26. A pistol-configured, electrically operated impact tool according to claim 25, wherein said cam surface-engaging elements comprise transverse projecting elements which extend from a main body portion of said shaft generally transverse of said axis, and wherein said cam surface portion of said translatable element has a slot therein, which is sized to allow said transverse projecting elements to pass therethrough and become disengaged from said cam surface portion of said translatable element upon said shaft having been rotated through said prescribed angle of rotation about said axis, thereby releasing said translatable element to be translated in said second direction along said axis by the force impart thereto by said force imparting mechanism.

27. An electrically operated impact tool according to claim 25, wherein said cam surface-engaging elements comprise ramp surface elements which are coupled to said shaft, and said cam surface portion of said translatable element and said ramp surface elements are configured to allow said ramp surface elements to become disengaged from said cam surface portion of said translatable element upon said shaft having been rotated through said prescribed angle of rotation about said axis, thereby releasing said translatable element to be translated in said second direction along said axis by the force impart thereto by said force-imparting mechanism.

28. A utility device according to claim 15, wherein said compression spring is placed around said shaft between said translatable element and said drive device in such a manner that, as said drive device rotates said shaft to translate said translatable element in said first direction along said axis, said compression spring is compressed between said translatable element and said drive device, so as to apply an increasing amount of force to said translatable element as said translatable element is translated in said first direction along said axis by rotation of said shaft.

29. A utility device according to claim 28, wherein said drive device comprises an electric motor.

* * * * *